(12) United States Patent
Kidambi et al.

(10) Patent No.: US 9,787,608 B2
(45) Date of Patent: Oct. 10, 2017

(54) UNIFIED FABRIC PORT

(75) Inventors: Jayakrishna Kidambi, San Jose, CA (US); Nilanjan Mukherjee, Santa Clara, CA (US); Vijoy Pandey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 995 days.

(21) Appl. No.: 13/276,966

(22) Filed: Oct. 19, 2011

(65) Prior Publication Data

US 2012/0093035 A1 Apr. 19, 2012

Related U.S. Application Data

(60) Provisional application No. 61/394,552, filed on Oct. 19, 2010.

(51) Int. Cl.
*H04L 12/28* (2006.01)
*H04L 12/931* (2013.01)
*H04L 12/935* (2013.01)

(52) U.S. Cl.
CPC ........ *H04L 49/351* (2013.01); *H04L 49/3054* (2013.01); *H04L 49/70* (2013.01)

(58) Field of Classification Search
CPC ......... H04L 2012/5617; H04L 12/4641; H04L 29/0836; H04L 41/0893; H04L 49/354; H04L 67/1053
USPC .......................................... 370/409, 410, 522
See application file for complete search history.

(56) References Cited

U.S. PATENT DOCUMENTS

| | | | |
|---|---|---|---|
| 2004/0105388 A1* | 6/2004 | Wilkins et al. | 370/235 |
| 2005/0078686 A1* | 4/2005 | Pajunpaa | 370/395.64 |
| 2005/0097212 A1* | 5/2005 | Engel et al. | 709/230 |
| 2006/0101140 A1* | 5/2006 | Gai et al. | 709/224 |
| 2008/0215793 A1* | 9/2008 | Hashimoto et al. | 711/6 |
| 2008/0298274 A1* | 12/2008 | Takashige et al. | 370/254 |
| 2010/0220620 A1* | 9/2010 | Timm et al. | 370/252 |
| 2010/0287274 A1* | 11/2010 | Martinez et al. | 709/224 |
| 2011/0299413 A1* | 12/2011 | Chatwani et al. | 370/252 |
| 2011/0299539 A1* | 12/2011 | Rajagopal et al. | 370/395.53 |

* cited by examiner

*Primary Examiner* — Charles C Jiang
*Assistant Examiner* — Ryan Kavleski
(74) *Attorney, Agent, or Firm* — Schmeiser, Olsen & Watts LLP (57) ABSTRACT

A method and system for configuring communications over a physical communication link connected between a physical port of a network switch and a physical port of a physical network interface on an end station. The communication link between the physical port of the network switch and the physical port of the physical network interface is logically partitioned into a number of channels of communication. For each channel, a channel profile is generated that defines properties of that channel. The physical network interface is instructed to self-configure such that the physical network interface is able to communicate with the network switch over each channel in accordance with the channel profile defined for that channel.

10 Claims, 4 Drawing Sheets

UNIFIED FABRIC PORT

RELATED APPLICATION

This application claims the benefit of U.S. Provisional Application No. 61/394,552, filed on Oct. 19, 2010, the entirety of which application is incorporated by reference herein.

FIELD OF THE INVENTION

The invention relates generally to data centers and data processing. More particularly, the invention relates to the partitioning and managing of communication links between physical network interfaces and network switches.

BACKGROUND

Server virtualization in data centers is becoming widespread. In general, server virtualization describes a software abstraction that separates a physical resource and its use from the underlying physical machine. Most physical resources can be abstracted and provisioned as virtualized entities. Some examples of virtualized entities include the central processing unit (CPU), network input/output (I/O), and storage I/O.

Virtual machines (VM), which are a virtualization of a physical machine and its hardware components, play a central role in virtualization. A virtual machine typically includes a virtual processor, virtual system memory, virtual storage, and various virtual devices. A single physical machine can host a plurality of virtual machines. Guest operating systems execute on the virtual machines, and function as though executing on the actual hardware of the physical machine.

A layer of software provides an interface between the virtual machines resident on a physical machine and the underlying physical hardware. Commonly referred to as a hypervisor or virtual machine monitor (VMM), this interface multiplexes access to the hardware among the virtual machines, guaranteeing to the various virtual machines use of the physical resources of the machine, such as the CPU, memory, storage, and I/O bandwidth.

Typical server virtualization implementations have the virtual machines share the physical network interface (aka, network adapter, network interface card, or NIC) of the physical machine for performing external network I/O operations. The hypervisor typically provides a virtual switched network (called a vswitch) that provides interconnectivity among the virtual machines on a single physical machine. The vswitch interfaces between the NIC of the physical machine and the virtual NICs (vNICs) of the virtual machines, each virtual machine having one associated vNIC. In general, each vNIC operates like a physical NIC, being assigned a media access control (MAC) address that is typically different from that of the physical NIC. The vswitch performs the routing of packets to and from the various virtual machines and the physical NIC.

Advances in network I/O hardware technology have produced multi-queue NICs that support network virtualization by reducing the burden on the vswitch and improving network I/O performance. A multi-queued NIC can be provisioned into multiple virtual NICs and can be configured as multiple NICs within an operating system. Generally, multi-queue NICs assign transmit and receive queues to each virtual machine. The NIC places outgoing packets from a given virtual machine into the transmit queue of that virtual machine and incoming packets addressed to the given virtual machine into its receive queue. The direct assignment of such queues to each virtual machine thus simplifies the handling of outgoing and incoming traffic.

Another advance in network I/O hardware technology is a physical network interface known as a converged network adapter (CNA). In general, a CNA combines the data networking of a NIC with storage networking; a single physical network interface can send and receive network data packets and storage data packets. Each CNA can have multiple virtual network interfaces or multiple instances of physical network interfaces implemented in a single physical device.

In the typical virtualization environment, however, I/O has become a performance bottleneck. Solutions to the I/O bottleneck, however, tend to overlook implications stemming from incorporating into the physical network interface network-switching functionality that increasingly overlaps the network-switching functionality of the fabric.

SUMMARY

In one aspect, the invention relates to a method for configuring communications over a physical communication link connected between a physical port of a network switch and a physical port of a physical network interface of an end station. The method comprises logically partitioning the communication link connected between the physical port of the network switch and the physical port of the physical network interface into a number of channels of communication. For each channel, a channel profile defining properties of that channel is generated. The physical network interface is instructed to self-configure such that the physical network interface is capable of communicating with the network switch over each channel in accordance with the channel profile defined for that channel.

In another aspect, the invention relates to a data center comprising an end station including a physical network interface having a physical I/O port, and a network switch including a physical switch port connected to the physical I/O port of the end station over a physical communication link. The communication link is logically partitioned into a plurality of channels. Each channel is associated with a channel profile that defines properties for communicating on that channel. The physical network interface exchanges frames with the network switch over each channel in accordance with the channel profile associated with that channel. The network switch configures a virtual port and the end station configures a virtual network interface for each channel for processing frames communicated over that channel.

In still another aspect, the invention relates to a switch comprising a physical port configured to connect to a physical network interface of an end station by a physical communication link, and a network processor configured to exchange messages with the physical network interface over the communication link. The exchanged messages operate to partition the physical communication link into the plurality of channels. The network processor is further configured to associate a virtual port and a channel profile with each channel. Each channel profile defines properties for communicating on the channel associated with that channel profile.

In still another aspect, the invention relates to a physical network interface comprising a physical input/output (I/O) port configured to connect to a physical communication link, and logic configured to logically partition communications through the physical I/O port over the physical communication link into a number of channels.

In still another aspect, the invention relates to a computer program product for setting up communications between a physical port of a switch and a physical port of a physical network interface on an end station. The computer program product comprises a computer-readable storage medium having computer-readable program code embodied therewith. The computer-readable program code comprises computer-readable program code configured to negotiate with the physical network interface to establish a number of channels over which to communicate with the physical network interface, computer-readable program code configured to logically partition a communication link between the physical port of the switch and the physical port of the physical network interface into the number of channels of communication, computer-readable program code configured to generate, for each channel, a channel profile that defines properties of that channel, and computer-readable program code configured to instruct the physical network interface to self-configure such that the physical network interface is able to communicate with the switch over each channel in accordance with the channel profile defined for that channel.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Administrators of data centers face increasing challenges from conflicting requirements, namely, to appease need for more bandwidth while consolidating infrastructure to reduce cost. These requirements lead to increasing traffic volume on the multiple networks typically deployed within a data center. For instance, a typical bandwidth requirement for an enterprise data center includes 1 Gb for communications, such as email, file sharing, and web service, 2 Gb for management, such as console O/S to manage the physical server and the virtual machines, 4 Gb for computations, such as server-to-server (e.g., VM-to-VM) communications, and 2 Gb for storage, for example, FCoE (Fibre Channel over Ethernet) and iSCSI (Internet Small Computer System Interface). To handle these various types of traffic, server administrators typically prefer a separate network for each type.

To accommodate these requirements with redundancy, a typical server may need at least eight NICs, a number that can increase if servers employ only 1 Gb NICs. Not only is the number of NICs directly proportional to the cost of I/O on a server, but it also can increase the number of access ports to the network and lead to greater cabling complexity. Consequently, the overall capital expenses for the data center can increase, even before taking into consideration the management overhead of the network and co-ordination between the network and server administrators. Notwithstanding, to meet the growing network demand, data centers can move towards 10 GbE networks for higher bandwidth. This trend towards 10 GbE networks, however, incurs greater costs commensurate with the 10 Gb NICs.

Additionally, NICs are increasingly acquiring networking functionality, although the management of the NIC of a server has traditionally occurred through the operating system of the server. This networking capability has led to two disjoint entities independently managing aspects of networking behavior, namely, the NIC and the network switch. Such independent management can lead to inefficiencies and inconsistencies. Applicants recognized advantages to configuring and managing the networking functionality of the NIC from the network switch (e.g., Ethernet switch). When viewed from this perspective, the NIC becomes an extension of the network switch, and thus of the switch fabric. Having a switch fabric component manage the NIC beneficially enables network policies to be applied based on knowledge of fabric characteristics.

For example, if a NIC can perform traffic filtering and provide QoS (Quality of Service) services, it is advantageous to apply those rules from a central fabric management tool that has the knowledge of the QoS distribution of traffic in the network. Further, because NICs can come from a multitude of vendors and, thus, can vary considerably in capability, having a switch fabric component control the NIC can add a dimension of flexibility to the management of the switch fabric. The implementation of certain features can occur either on the NIC or on the network switch, depending on the availability of resources on the NIC. Having the two disjoint entities work together, with the networking workload divided between them, simplifies the network switch and management overhead of the network edge.

Data centers described herein implement a Unified Fabric Port (UFP) protocol to address the aforementioned capital expense and manageability problems. In brief overview, the UFP protocol consolidates multiple network partitions within a single, high-speed, physical communication link (e.g., 10 GbE or higher Ethernet), while maintaining a separation between the network partitions as though the partitions were instead separate physical connections. The UFP protocol logically partitions the physical communication link that connects the port of a physical network interface on a server to the port of a network switch, into logical subdivisions or channels. To the operating system on the server (or to the hypervisor), each channel appears as an independent physical network interface having its own unique MAC address. Each channel is independently managed as a separate switch port (i.e., virtual port) on the network switch. The number of channels and the bandwidth of each channel are configurable from the network switch or through an API to the physical network interface. New channels can be dynamically added to the communication link without needing to reboot the switch, although a reboot may be needed on the server in order to trigger a PCI bus scan. The network switch (or API to the physical network interface) has control over the number of partitions of the physical network interface produced and over some of basic networking attributes (e.g., allowed VLANs). Each channel, though connected to the same physical port of the network switch, can operate as though connected to a single VLAN domain or isolated VLAN domain.

Figure 1:
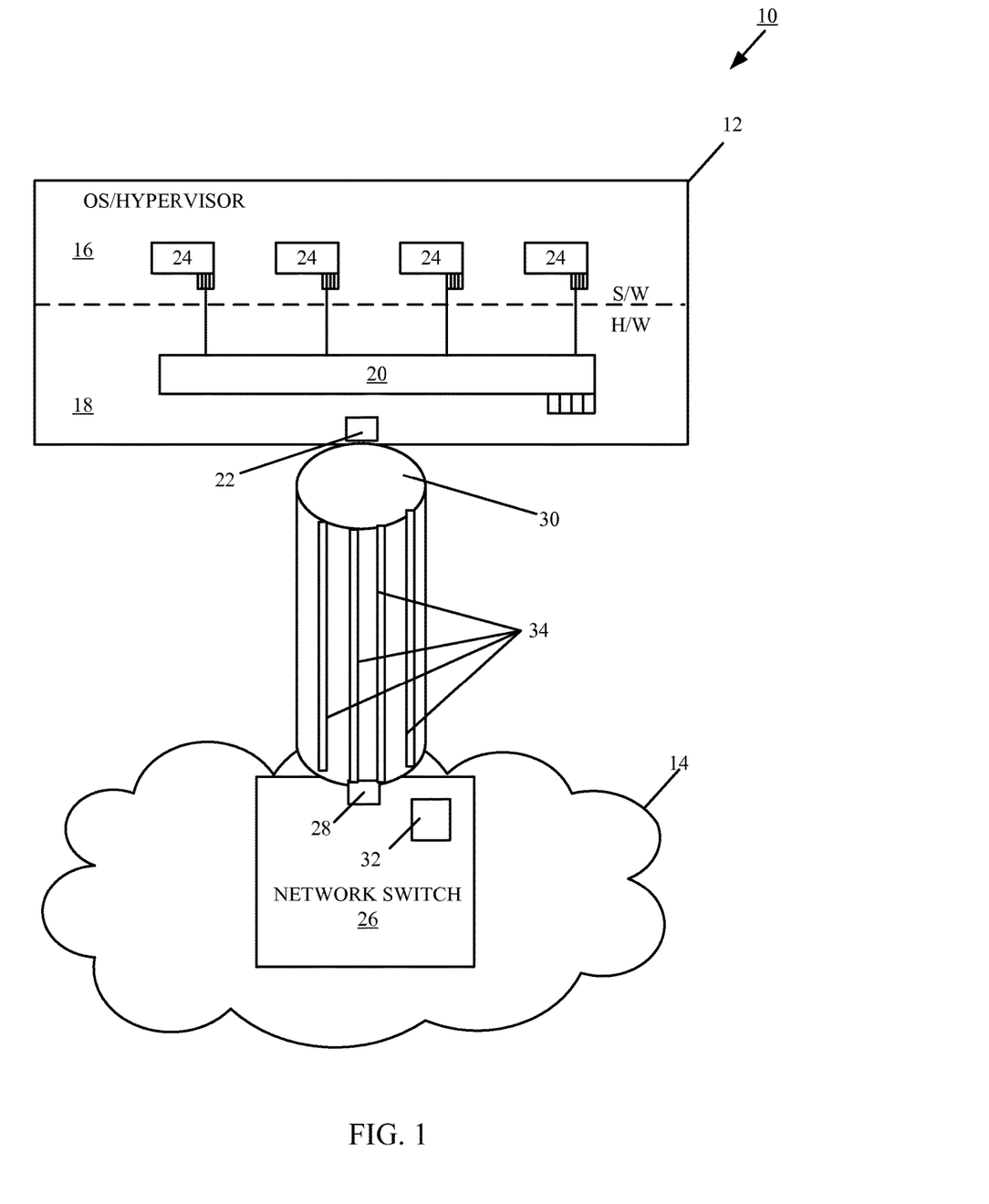
FIG. 1 is a block diagram of an embodiment of a data center or enterprise network including a network switch connected by a physical communication link to a physical machine having a physical network interface (e.g., NIC).

FIG. 1 shows an oversimplified embodiment of a data center 10 (or enterprise network) including a physical machine (end station) 12 in communication with a switch fabric 14. In general, a data center is a location that serves as a computational, storage, and networking center of an organization. The equipment of a data center can reside together locally at a single site or distributed over two or more separate sites.

The physical machine 12 is an embodiment of a physical server, such as a server blade. The physical machine 12 includes software (S/W) 16, such as an operating system and a hypervisor, and hardware (H/W) 18, such as a physical network interface 20 connected to a physical I/O port 22, one or more processors, memory, and a PCI bus. The hypervisor is a software entity that enables multiple virtual machines to share the hardware 18. The software 16 provisions a plurality of virtual network interfaces or vNICs 24, each with its own MAC address, through which virtual machines can communicate with the physical network interface 20. The physical machine 12 can reside alone or be stacked within a chassis with other physical machines, for example, as in a rack server or in a blade server.

The physical network interface 20 is generally a network I/O device that handles the network I/O operations to and from the switch fabric 14 over the physical I/O port 22. Examples of the physical network interface 20 include, but are not limited to, network interface cards (NICs), SR-IOV (Single-Root I/O Virtualization) NICs and non-SR-IOV NICs, multi-queue NICs, network interface controllers, I/O adapters, and converged network adapters (CNAs).

The functionality of the physical network interface 20 can be split into two domains; server-facing functionality and network-facing functionality. The server-facing functionality includes network protocol offloading mechanisms, such as CSO (checksum offloading), TSO (TCP Segmentation Offload), iSCSI, and TOE (TCP Offload Engine). The network-facing functionality includes such network switching functionality, for example, SR-IOV switching.

The switch fabric 14 includes a network switch 26 with a physical switch port 28. (Normally, network switches have more than one physical port, but only one port is shown here to simplify the description.) In general, the network switch 26 is a network element that performs packet switching between downlink and uplink ports. The physical switch port 28 of the network switch 26 is an example of a downlink port connected to the physical I/O port 22 of the physical machine 12 by a high-speed communication link 30. The network switch 26 includes a network processor 32 for establishing logical channels over the communication link 30 in accordance with the UFP protocol, as described in more detail herein. The network switch 26 can reside alone or be stacked within the same equipment rack or chassis as the physical machine 12. In one embodiment, the network switch 26 is an Ethernet edge switch, and the communication link 30 is a 10 GbE link.

In brief overview, the physical network interface 20 and network switch 26 communicate in accordance with the UFP protocol to logically partition the communication link 30 into a plurality of UFP channels 34. Each UFP channel 34 can be dedicated to carrying a particular type of traffic, for example, management traffic or computation traffic. For each UFP channel 34, the network switch 26 configures a virtual port (vport) and the physical machine 12 configures a vNIC 24. The configuration of the virtual port and vNIC are based on a channel profile (i.e., configuration details) defined for that UFP channel 34.

The UFP protocol is a link level protocol, running as a separate instance for each physical communication link connected between an I/O port 22 and a switch port 28. According to one embodiment of the UFP protocol, the physical network interface 20 operates as a slave device, requesting the configuration details for each UFP channel, and the network switch 26 operates as the master device to provide them. Preferably, the physical network interface 20 is able to acquire the configuration details from the network switch 26 within a deterministic period before the server (physical machine 12) boots its operating system, which triggers a PCI-bus scan. By so doing, the physical network interface 20 is able to supply specific characteristics about itself to the operating system, which take effect when the operating system subsequently boots. In addition, the physical network interface 20, switch port 28, and UFP protocol preferably support run-time configuration changes. Although operating systems, in general, do not rescan or dynamically detect the presence of a new device on the same bus, certain modifications to the kernel can be made so that the server performs a dynamic scan and configures a new physical network interface without needing to reboot.

The UFP protocol has three general categories of communications: 1) UFP channel initialization; 2) UFP channel control; and 3) UFP channel data paths. For UFP channel initialization, the I/O port 22 and switch port 28 can negotiate the number of UFP channels and establish channel identifiers (IDs) for the channels. Each initialized UFP channel has two components: 1) a data component; and 2) a control component, with UFP channel IDs being the same for both the control and data components. For UFP channel control, the properties of an initialized UFP channel, for example, the transmit and receive bandwidths, can be modified by the network switch by sending a control message on the UFP channel. Although the UFP channel IDs are the same for both the control and data components, the destination MAC address for a control UFP frame is a well-known address. For UFP channel data paths, the UFP protocol supports two different types. The different types of data paths enable a server (physical machine 12) with multiple NICs to connect to a single physical switching domain with a single VLAN domain (called Type 1) or to multiple physical switching domains, wherein each physical switching domain has its own VLAN (called Type 2).

Channel Initialization

In one embodiment, the physical network interface 20 requests the needed number of UFP channels from the network switch 26. The number of UFP channels requested by the physical interface 20 can be established in one of multiple ways: 1) preferably, the network switch 26 can send a UFPCHAN TLV (described below) to the physical network interface 20 with the number of UFP channels; or 2) the BIOS of the physical network interface 20 stores the number (e.g., in non-volatile memory). The receipt of the UFPCHAN TLV (if used for this purpose) can result in storing the requested number of UFP channels in the non-volatile memory, to take effect upon reboot of the server 12.

If the number of UFP channels requested by physical network interface 20 can be satisfied, the network switch 26 responds with an acknowledgement and provides channel identifiers to be used with each requested channel. Subsequently, data and control traffic flowing between the I/O port 22 and the switch port 28 is tagged with the channel identifier based on the UFP channel to which the traffic belongs (e.g., the physical network interface can map a PCIe function to a given UFP channel, and tag all outbound frames with the channel identifier).

UFP channel initialization can use the Channel Discovery and Configuration Protocol (CDCP) TLV, as defined in the IEEE 802.1Qbg standard proposed by the IEEE Edge Virtual Bridging (EVB) project of the 802.1 Data Center Bridging task group. The fields of the CDCP TLV and exchange sequence of TLVs, as defined in the IEEE 802.1Qbg specification, apply unmodified to UFP channel initialization. At any time after a UFP channel is assigned a channel ID, the network switch 26 can change the channel ID. In addition, after the establishment of a UFP channel, the network switch 26 and physical network interface 20 exchange channel properties in EVB TLVs (also described in the IEEE 802.1Qbq specification). For UFP channels, the bits for the STD and ECP (Edge Control Protocol) capabilities are set in the EVB TLV. The exchanged EVB TLVs provide an indication of ECP readiness at the network switch 26 and at the physical network interface 20. The network switch 26 does not permit communications between UFP channels on the same physical switch port 28.

Channel Control

After UFP channels are established, UFP messages can be exchanged for control and configuration of each UFP channel. Each ECP frame contains a UFP message and the channel ID of the UFP channel for which the UFP message pertains. The UFP messages have a standard TLV (Type-Length-Value) format, including a type field, a length field, a status field, and, optionally, a UFP message field. The type field uniquely identifies the type of UDP message carried by the TLV (e.g., UFPCHAN, LINK-UP, TXBW, etc). The length field identifies the length of the TLV. The status field contains the success or failure of a request-response exchange between the network switch and the physical network interface. The meanings of various status codes include, but are not limited to: success with immediate action; success with delayed action; invalid request; invalid state; insufficient resources; alternate proposal; and unspecified error. The UFP message field holds the particular UFP message carried by the control TLV. Transport of the control TLVs occurs in accordance with the Edge Control Protocol (ECP).

The network switch sends a UFPCHAN TLV to the physical network interface to request the generation of UFP channels. The UFPCHAN TLV is a link layer TLV (the ECP frame is not S-tagged). If the physical network interface considers the number of channels suggested by the network switch to be acceptable, and is able to generate the UFP channels at the requested time, physical network interface subsequently requests channel assignments. The UFPCHAN TLV can also be used to add to the number of UFP channels dynamically, provided the physical network interface is in an appropriate state. When able to satisfy immediately the request to generate or add a new UFP channel, the physical network interface responds with an immediate action success value. When the physical network interface cannot immediately respond, but can fulfill the request at a server reboot, the physical network interface returns a delayed action success value in response to the UFPCHAN TLV from the network switch.

The network switch and the physical network interface use a PROPS TLV to configure the UFP channel properties (either the network switch or the physical network interface can send the PROPS TLV). The network switch can locally set some of the UFP channel properties; whereas the physical network interface can locally set other UFP channel properties. In brief, the PROPS TLV identifies whether the type of data path for the UFP channel is Type 1, the Type 2, or an FCoE channel. The UFP message field of the PROPS TLV contains a bitmask that identifies the properties to be configured by the recipient of the PROPS TLV. If able to support all requested properties, the recipient returns a PROPS TLV with the status field coded as success with immediate action. If the recipient cannot support a requested property, the corresponding bit is zeroed in the recipient's return PROPS TLV.

By sending a TXBW TLV to the physical network interface, the network switch requests the transmit bandwidth for the UFP channel. The UFP message field of the TXBW TLV contains the requested transmit bandwidth. If the physical network interface accepts the request, the return TXBW TLV contains the acceptable transmit bandwidth. Optionally, this bandwidth can be negotiated. The physical network interface can accept the bandwidth requested by the network switch or propose an alternate value. If the alternate value is acceptable to the network switch, a TXBW TLV containing the acceptable bandwidth passes from the network switch to the physical network interface.

By sending a RXBW TLV to the physical network interface, the network switch requests a receive bandwidth for the UFP channel. As with the transmit bandwidth, the physical network interface and the network switch can negotiate the receive bandwidth value.

Both the network switch and the physical network interface can send LINK-DOWN and LINK-UP TLVS to bring down or bring up a virtual link corresponding to the UFP channel specified in the TLV. The physical network interface must respond to the TLV so that the operating system of the server recognizes status change of the channel. By sending a VLAN MASK TLV to the physical network interface, the network switch can enable or disable specific OS-inserted VLAN tags for Type 1 UFP channels. By a RESET TLV, either the physical network interface or the network switch can initiate a reset and reestablishment of UFP channel properties.

Channel Data Paths

As described previously, the UFP protocol supports two different types of data paths. For Type 1 data paths, untagged frames are associated with the VLAN ID of the UFP channel. If the OS of the physical network interface tags frames, those frames belong to the VLAN ID in the tag, provided the network switch enables the tag. For Type 2 data paths, all frames, whether tagged or untagged, are associated with the VLAN ID of the UFP channel. OS-inserted tags pass through unmodified in this mode of operation.

Figure 2:
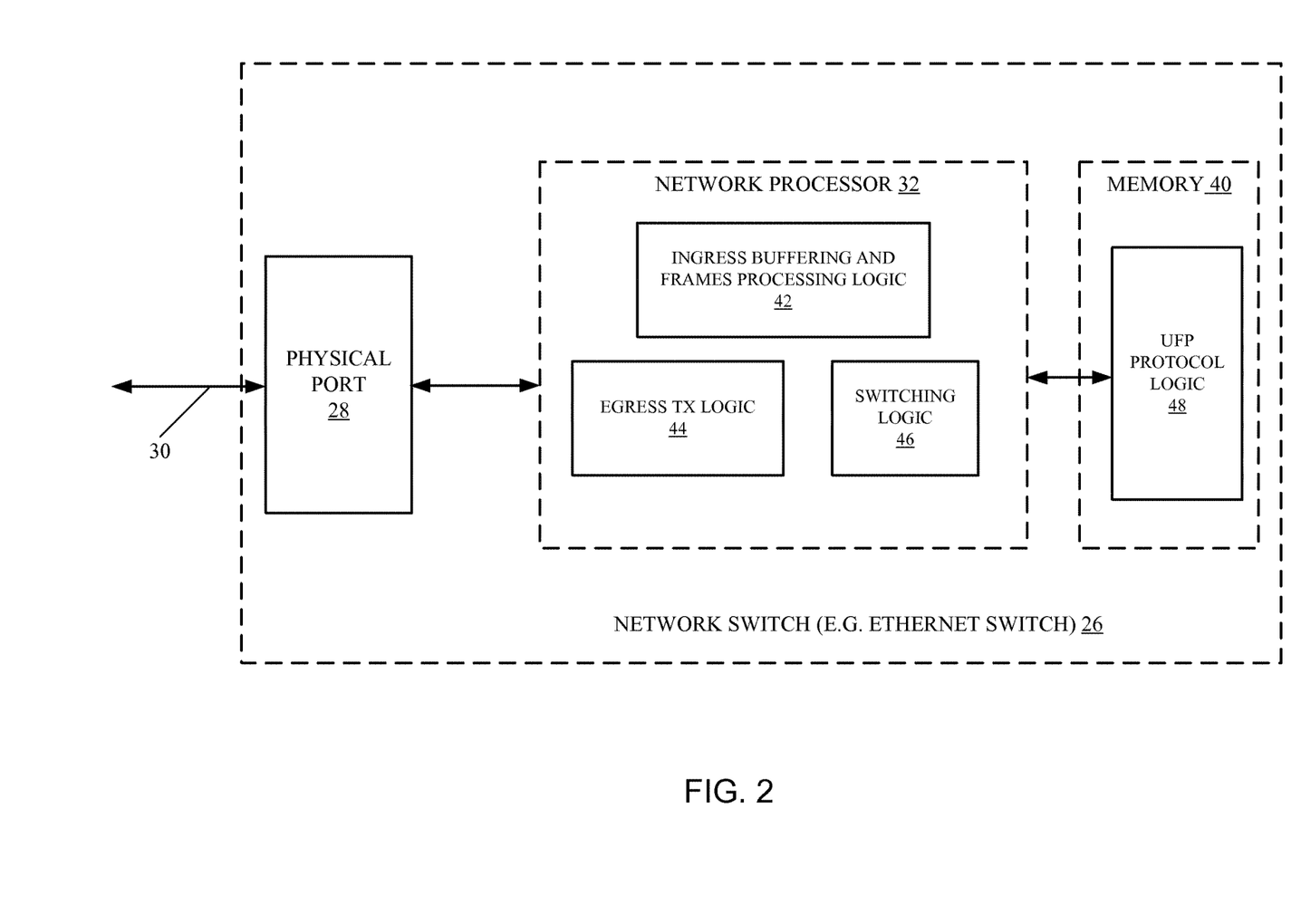
FIG. 2 is a functional block diagram of an embodiment of the network switch.

FIG. 2 shows an embodiment of architecture for the network switch 26 including the physical port 28 (e.g., a 40 G or 100 G Ethernet port) in communication with the network processor 32. The network switch 26 can have more physical ports than the one physical port shown. The network processor 32 is in communication with memory 40. The network processor 32 includes ingress buffering and frame processing logic 42, egress transmission logic 44, and switching logic 46. In brief, the logic of the network processor 32 performs Layer 2 switching and dispatches data units arriving through the physical port 28 in accordance with virtual port assignments to UFP channels and the traffic-handling policies (e.g., bandwidth allocation) associated with the virtual ports. The network processor 32 can be embodied in a custom semiconductor integrated circuit (IC), such as an application-specific integrated circuit (ASIC) or field-programmable gate array (FPGA) semiconductor device. The memory 40 stores the logic 48 for implementing the UFP protocol. The logic 48 can be a software program executed by the network processor 32 to give the network switch 26 its UFP functionality, as described herein. Alternatively, the logic 48 may be implemented in firmware, or as a combination of software and firmware.

Figure 3:
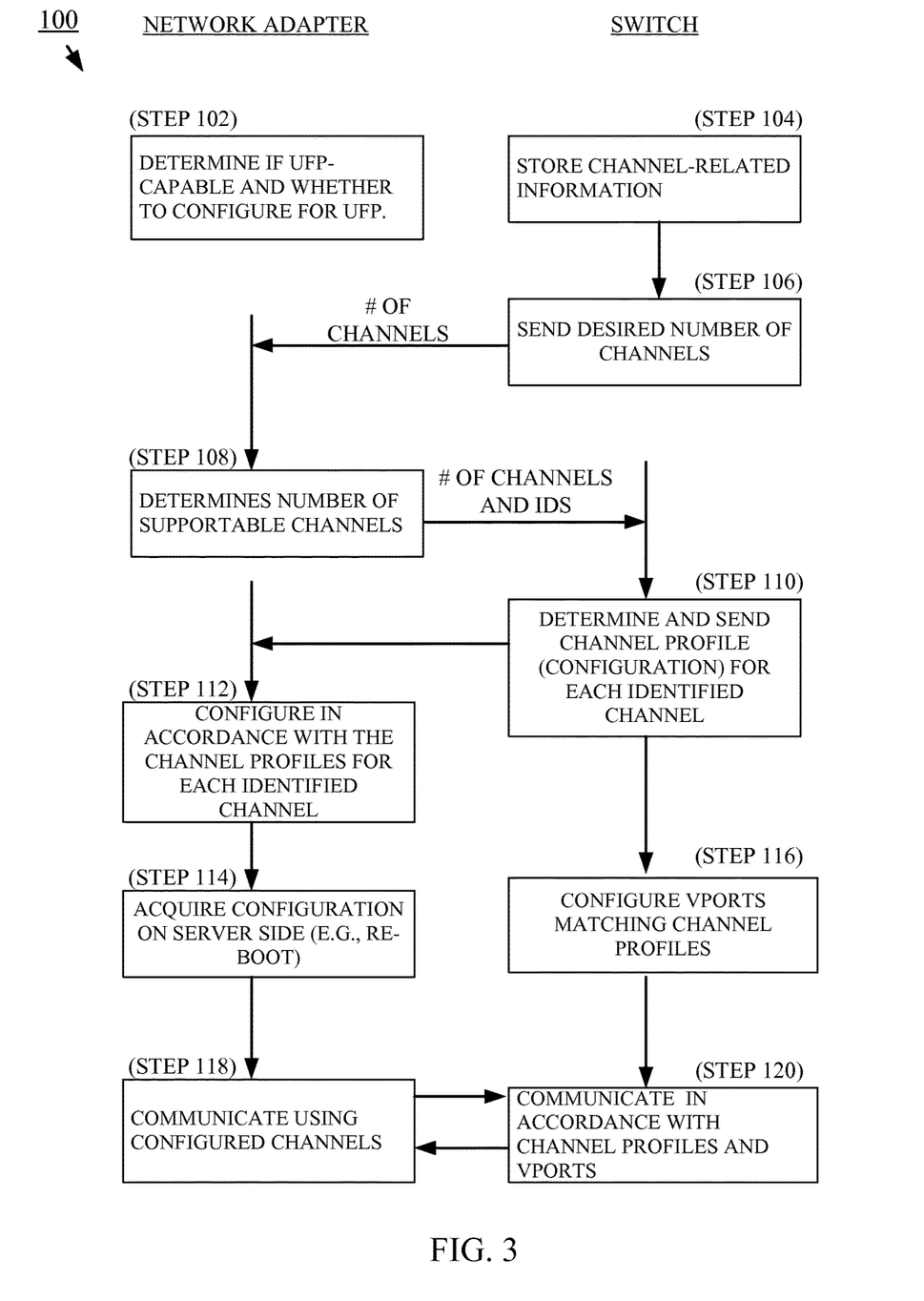
FIG. 3 is a flow diagram of an embodiment of a process of configuring a physical network interface of a server for communicating over a physical communication link between a network switch and the physical network interface.

FIG. 3 shows an embodiment of a process 100 of configuring a physical network interface of a server and a network switch for communicating over the physical communication link between the switch port and the I/O port of the physical network interface. At step 102, an administrator (e.g., through software running on the network switch or on a management station) determines whether the physical network interface is capable of communicating in accordance with the UFP protocol, and, if so, whether to configure the physical network interface as a unified fabric port. When the physical network interface is UFP-capable and selected for UFP configuration, the administrator specifies the categories of channels to be configured, the characteristics of such channels, and the mechanisms by which the channels connect to the network. The network switch can store (step 104) the specified information in memory as channel profiles (i.e., configuration files).

The network switch and physical network interface subsequently engage in a negotiation process to determine the number of channels. In one embodiment, the network switch initiates the negotiation process by transmitting (step 106) the desired number of channels to the physical network interface. In response, the physical network interface (step 108) determines the number of channels that it will support, not to exceed the number of channels provided by the network switch. Along with this number, the physical network interface sends the network switch a channel identifier for each requested channel. In response to the information received from the physical network interface, the network switch determines (step 110) the channel profile for each channel identified by the physical network interface, and sends these channel profiles to the physical network interface.

After receiving the channel profiles, the physical network interface configures (step 112) each identified channel with the channel profile assigned to that channel. The server installs (step 114) the configuration of the physical network interface (e.g., reboot). The network switch configures (step 116) virtual ports that match the channel profiles (one virtual port for each different channel). The physical network interface communicates (step 118) with the network switch over the physical communication link using the configured UFP channels and associated virtual network interfaces. Conversely, the network switch communicates (step 120) with the physical network interface over the physical communication link using the UFP channels configured in accordance with the channel profiles and virtual ports.

In another embodiment of the negotiation process, the physical network interface initiates the negotiation, sending the network switch the number of channels it can handle, and the network switch responds with an agreed upon number of channels, not to exceed the number submitted by the physical network interface. The network switch also sends the channel identifiers.

In still another embodiment of the negotiation process, instead of a direct negotiation between the physical network interface and the network switch, a third device (i.e., an intermediary, an arbitrator) runs software that communicates with both the physical network interface and the network switch to establish the number of channels and channel identifiers. This third device can further operate to send the channel profiles to the physical network interface and to the network switch; the physical network interface using the channel profiles to configure itself; and the network switch using the channel profiles to configure a virtual port for each channel in accordance with the channel profile of that channel.

Figure 4:
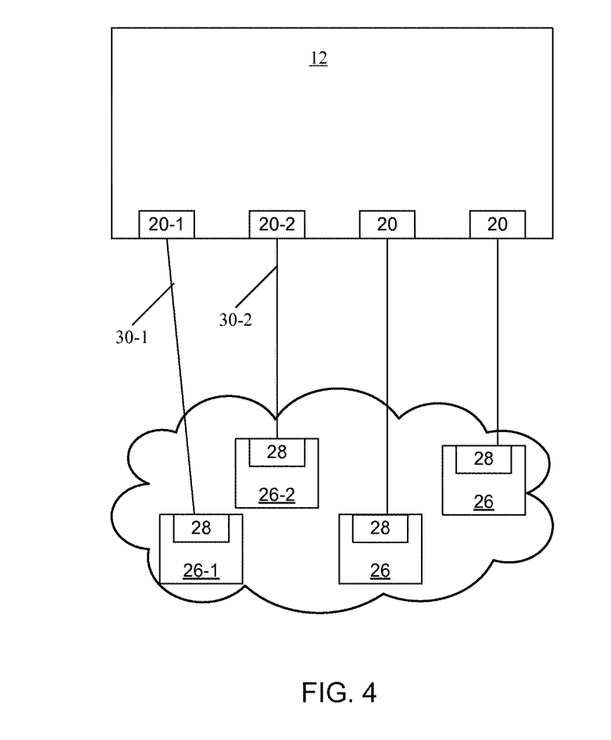
FIG. 4 is a diagram of an embodiment of connectivity between multiple physical network interfaces of a server and network switches of a switching domain.

FIG. 4 shows an embodiment of connectivity between a server 12 with a plurality of physical network interfaces 20 and a switch fabric 14 having a plurality of network switches 26. In this embodiment, the switch fabric 14 represents a single physical domain, wherein each physical network interface 20 is connected to a physical switch port 28 one of the network switches 26 in the single physical domain by a communication link 30. Each communication link 30 can carry a different type of UFP channel. For example, a UFP channel of the communication link 30-1 between the network switch 26-1 and the physical network interface 20-1 can carry management traffic, while a UFP channel of the communication link 30-2 between the network switch 26-2 and the physical network interface 20-2 can carry storage traffic. Accordingly, in this embodiment, each physical network interface corresponds to one type of UFP channel.

Figure 5:
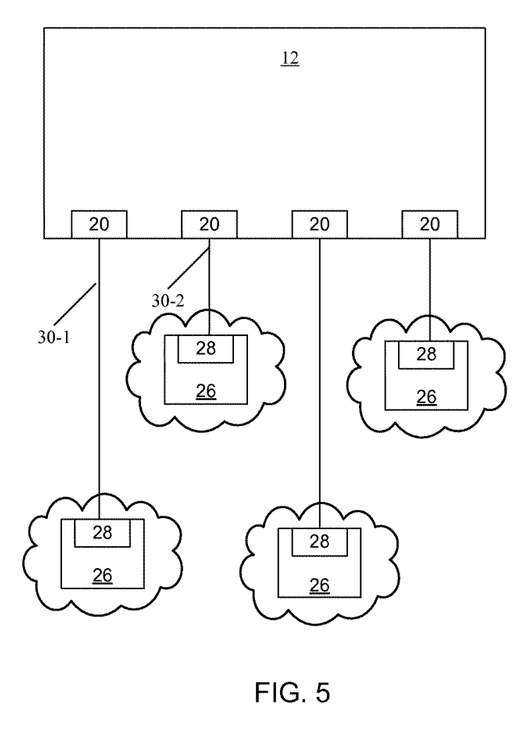
FIG. 5 is a diagram of another embodiment of connectivity between multiple physical network interfaces of a server and network switches of separate switching domains.

FIG. 5 shows another embodiment of connectivity between a server 12 with a plurality of physical network interfaces 20 and a plurality of network switches 26. In this embodiment, each network switch 26 resides in its own physical domain (which represents a degenerate case), with each physical domain having its own full range of VLANs. Similar to the example of FIG. 4, each communication link 30 can carry a different type of UFP channel and, accordingly, each physical network interface corresponds to one type of UFP channel. In FIG. 4, a given VLAN (V) can have domain-specific usage.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A data center, comprising:
   an end station including a physical network interface having a physical I/O port; and
   a network switch including a physical switch port connected to the physical I/O port of the end station over a physical communication link, the physical communication link being logically partitioned according to Unified Fabric Port (UFP) protocol into a plurality of channels with each channel having its own unique MAC address and each channel is independently managed as a separate virtual port on the network switch, each channel being associated with a channel profile that defines properties for communicating on that channel, the physical network interface exchanging frames with the network switch over each channel in accordance with the channel profile associated with that channel, the network switch configuring the virtual port and the end station configuring a virtual network interface for each channel for processing frames communicated over that channel, the network switch being configured to switch frames arriving at the physical switch port based on the virtual port and channel profile associated with a channel to which such frames belong.

2. The data center of claim 1, wherein the physical network interface and the network switch are each configured to negotiate the number of channels.

3. The data center of claim 1, wherein each channel is associated with a unique ID used as a tag in frames exchanged between the network switch and physical network interface that identifies the channel to which the frames belong.

4. The data center of claim 1, wherein the end station is configured to associate each channel with a unique virtual network interface and the network switch is configured to associate each channel with a unique virtual port.

5. The data center of claim 1, wherein the physical network interface and network switch are each configured to dynamically modify channel properties of a given channel.

6. A switch, comprising:
   a physical port configured to connect to a physical network interface of an end station by a physical communication link; and
   a network processor configured to exchange messages with the physical network interface over the physical communication link, the exchanged messages operating to partition the physical communication link into the plurality of channels according to Unified Fabric Port (UFP) protocol, with each channel having its own unique MAC address and each channel independently managed as a separate virtual port on the network switch, the network processor being further configured to associate the virtual port and a channel profile with each channel, each channel profile defining properties for communicating on the channel associated with that channel profile, the network processor comprising switching logic configured to switch data units arriving at the physical port based on the virtual port and channel profile associated with a channel to which such data units belong.

7. The switch of claim 6, wherein the network processor is further configured to negotiate the number of channels with the physical network interface.

8. The switch of claim 6, wherein the network processor is further configured to associate each channel with a unique ID used as a tag in frames exchanged between the network switch and physical network interface that identify the channel to which the frames belong.

9. The switch of claim 6, wherein the network processor is further configured to associate each channel with a unique virtual port.

10. The switch of claim 6, wherein the network processor is further configured to dynamically modify channel properties of a given channel.

* * * * *